No. 860,186. PATENTED JULY 16, 1907.
F. BEEMER.
SPRING SEPARATOR FOR BALL BEARINGS.
APPLICATION FILED NOV. 23, 1906.

Witnesses:
Inventor,
Frank Beemer,
By Augustus B. Stoughton
Atty.

THE NORRIS PETERS CO., WASHINGTON, D. C.

UNITED STATES PATENT OFFICE.

FRANK BEEMER, OF PHILADELPHIA, PENNSYLVANIA, ASSIGNOR TO STANDARD ROLLER BEARING COMPANY, OF PHILADELPHIA, PENNSYLVANIA, A CORPORATION OF NEW JERSEY.

SPRING-SEPARATOR FOR BALL-BEARINGS.

No. 860,186.  Specification of Letters Patent.  Patented July 16, 1907.

Application filed November 23, 1906. Serial No. 344,782.

*To all whom it may concern:*

Be it known that I, FRANK BEEMER, a citizen of the United States, and a resident of Philadelphia, in the county of Philadelphia and State of Pennsylvania, have invented a new and useful Spring-Separator for the Balls of Bearings, of which the following is a specification.

The principal object of the present invention is to provide a comparatively inexpensive, easily constructed and efficient spring separator which will operate reliably and satisfactorily when interposed between the balls of an annular or other type of ball bearing.

To this and other ends hereinafter set forth the invention stated in general terms comprises the improvements to be presently described and finally claimed.

Figure 1:
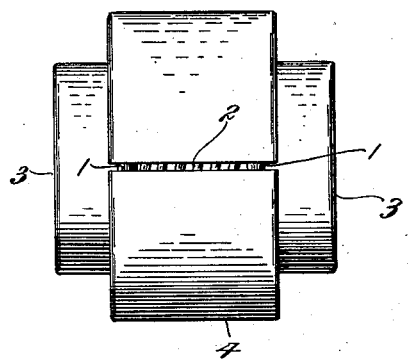
Figure 2:
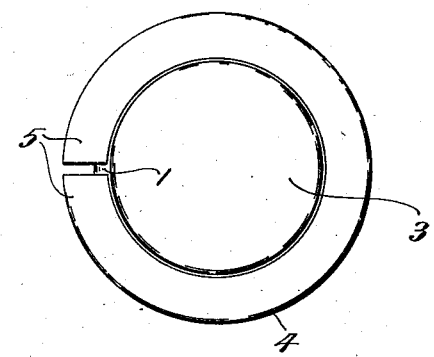
Figure 3:
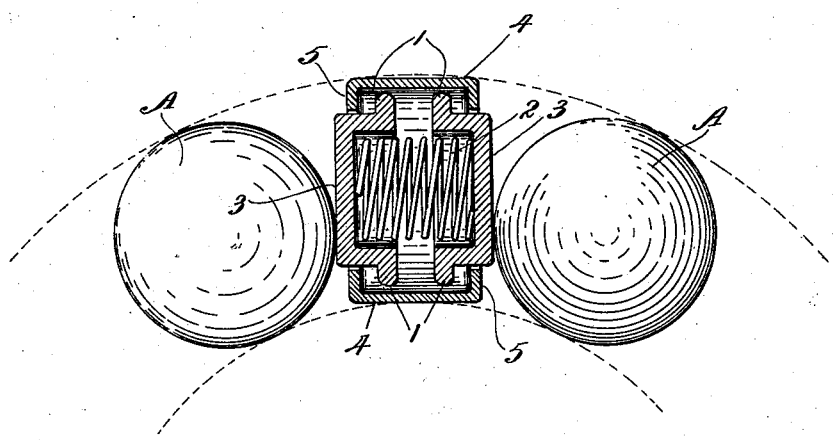

The nature and characteristic features of the invention will be more fully understood from the following description taken in connection with the accompanying drawings forming part hereof and in which Figure 1, is an elevational view and Fig. 2, an end view of a separator embodying features of the invention, and Fig. 3, is a sectional view of the separator diagrammatically showing it arranged between the balls of an annular retainer.

In the drawings there are duplicate cylindrical caps each provided at its open end with an outwardly turned circular rim flange 1. These caps receive a spring 2, which by pushing upon the interiors of their bottoms tends to push them apart. The exterior faces 3 of the bottoms of the caps constitute abutments for balls indicated at A, in Fig. 3.

4, is a ring which encircles the rim flanges 1 of each cap and it is provided with inturned flanges 5, which confine the caps by engaging their outturned flanges 1, thus the caps may, when the power of the spring 2, is overcome work toward each other within the ring 4, or perhaps more properly, the flanges 5 thereof; but the spring may not force the caps apart because the flanges 5 engaging the flanges 1 prevent this. An obviously convenient way of assembling the device is to split the ring 5, as shown in the drawings, but this description and showing are not intended to limit the invention to such construction.

The device may be so constructed that the outturned flanges of the caps by contacting with each other protect the spring from excessive compression and also prevent the outer ends 3, of the cap from being pushed too far inward.

What I claim is:

A spring separator for ball bearings comprising a pair of cylindrical caps each provided at its open end with an out-turned circular flange, a spring arranged in said caps, and a ring encircling the out-turned flanges of the caps and provided with marginal inturned flanges for confining the caps, substantially as described.

In testimony whereof I have hereunto signed my name in the presence of witnesses.

FRANK BEEMER.

Witnesses:
W. J. JACKSON,
K. M. GILLIGAN.